United States Patent [19]

Ross et al.

[11] 3,934,252
[45] Jan. 20, 1976

[54] CLOSED LOOP TUNNEL DIODE RECEIVER FOR OPERATION WITH A BASE BAND SEMICONDUCTOR TRANSMITTER

[75] Inventors: Gerald F. Ross, Lexington; Kenneth W. Robbins, Wilmington, both of Mass.

[73] Assignee: Sperry Rand Corporation, New York, N.Y.

[22] Filed: Apr. 8, 1974

[21] Appl. No.: 458,967

[52] U.S. Cl. ............... 343/7 VM; 325/16; 325/312; 325/322; 325/325; 343/7.3
[51] Int. Cl.² ....................... G01S 9/12; H04B 1/38
[58] Field of Search ............. 325/16, 18, 21, 23, 24, 325/312, 313, 319, 321–326, 400, 408, 411, 484, 496; 340/33, 34; 343/7 A, 7 ED, 17.1 R, 112 CA, 7.3

[56] References Cited
UNITED STATES PATENTS

| | | | |
|---|---|---|---|
| 2,677,758 | 5/1954 | Robinson et al. | 325/322 |
| 2,981,942 | 4/1961 | Gross | 343/7 |
| 3,662,316 | 5/1972 | Robbins | 340/167 R |
| 3,794,996 | 2/1974 | Robbins et al. | 343/7 A |

*Primary Examiner*—George H. Libman
*Assistant Examiner*—Marc E. Bookbinder
*Attorney, Agent, or Firm*—Howard P. Terry

[57] ABSTRACT

A vehicle safety apparatus includes a base band pulse transmitter-receiver system for the detection of an impending collision immediately prior to the contact of the vehicle with another object for the actuation of restraining or other safety devices to protect the occupants of the vehicle when the crash event actually occurs. A semiconductor base band transmitter and receiver system is synchronously operated by a master clock, providing precise operation of the receiver gain control, sensitivity time control, and other receiver functions, in a low-cost, rugged, long-lived object detection system.

7 Claims, 6 Drawing Figures

CLOSED LOOP TUNNEL DIODE RECEIVER FOR OPERATION WITH A BASE BAND SEMICONDUCTOR TRANSMITTER

CROSS REFERENCE TO RELATED PATENT

This invention is related to the invention of the G. F. Ross, K. W. Robbins U.S. Pat. application Ser. No. 380,628 for a "Closed Loop Gain Control Tunnel Diode Base Band Object Detector," filed July 19, 1973 and assigned to the Sperry Rand Corporation, issued Dec. 31, 1974 as U.S. Pat. NO. 3,858,204.

BACKGROUND OF THE INVENTION

1. Field of the Invention

The invention pertains to safety apparatus for the detection of an impending vehicular collision and for the reliable and automatic operation of protective devices in the event of a collision and more particularly concerns radio receiver apparatus for utilizing reflected base band signals for the generation, according to the certainty of an impending collision, of control signals for the reliable operation of passenger protective devices.

2. Description of the Prior Art

In the prior art, base band transmitter-receiver systems for the protection of vehicle occupants have generally sought to use inexpensive and trouble-free components with a view of ensuring long-lifed and reliable operation of the apparatus. For these and other reasons, a logical choice for the base band transmitter has been that it be based upon a self-synchronizing, mechanically operated switch, such as a conventional mercury wetted reed switch. Such an arrangement is described in the G. F. Ross, K. W. Robbins U.S. Pat. application Ser. No. 380,628 for a "Closed Loop Gain Control Tunnel Diode Base Band Object Detector," filed July 19, 1973 and assigned to the Sperry Rand Corporation now U.S. Pat. No. 3,858,204. Mercury wetted reed switches are low in cost and are otherwise suitable for relatively low duty cycle operation. However, operation with external synchronization at high duty cycles is desirable for more precise range detection, and enhanced dependability and longer life are also particularly needed in the transmitter-receiver system.

SUMMARY OF THE INVENTION

The present invention relates to a vehicular passenger safety system that includes base band radio transmitter-receiver means for the detection of a potential collision of a protected vehicle with another vehicle or other object immediately prior to impact and for actuation of passenger restraining or other safety devices also just prior to the collision for the protection of the occupants of the vehicle before the crash event actually occurs. The protective system employs base band or very short duration electromagnetic pulse transmission and reception devices with range gating elements adapted in effect to sense the relative speeds of the vehicles involved in the potential crash situation. The simultaneous presense of such signals activates the passenger restraining or other safety devices in anticipation of the actual collision event.

The novel sensor system beneficially makes use of the ruggedness and reliability of a semiconductor transmitter which, because it can be directly triggered, may be controlled by a master synchronizing clock. The transmitter and receiver elements of the system may both be controlled by the same master clock, providing relatively temperature insensitive and precise operation of the various timed elements of the receiver including the receiver gain control, its sensitivity time control, and other elements.

The novel base band collision sensor system operates effectively with very low power consumption, so that power supply cost and size are minimal. Characteristic of the novel system is that inexpensive and reliable components, operating at a relatively high duty cycle may be used throughout the sensor.

DESCRIPTION OF THE PREFERRED EMBODIMENT

The present invention operates with base band or subnanosecond duration electromagnetic pulses and employs dispersionless, very wide band antenna and transmission line elements which, in the receiver, cooperate directly with a tunnel diode signal detector for detecting the total energy of the incoming base band pulse. Since the total energy of the received base band pulse is instantaneously supplied by the dispersionless line in the form of a transverse electric mode wave to the germanium tunnel diode circuit, the system is adapted to operate with short base band signals having spectral components, the individual amplitudes of which are all incapable of detection by convention receivers.

The total energy of each base band pulse can, however, be relatively larger than the level of noise or other interfering signals in the vicinity of the sensor. Base band signals not affecting convention receivers are readily received, detected, and processed without the sensor being affected in substantial degree by other radio transmissions. Processing of the reflected base band signals is accomplished by simple signal circuits avoiding the need for signal frequency conversion and avoiding the problems associated with alignment and operation of conventional radio and intermediate frequency amplifiers.

Figure 1:
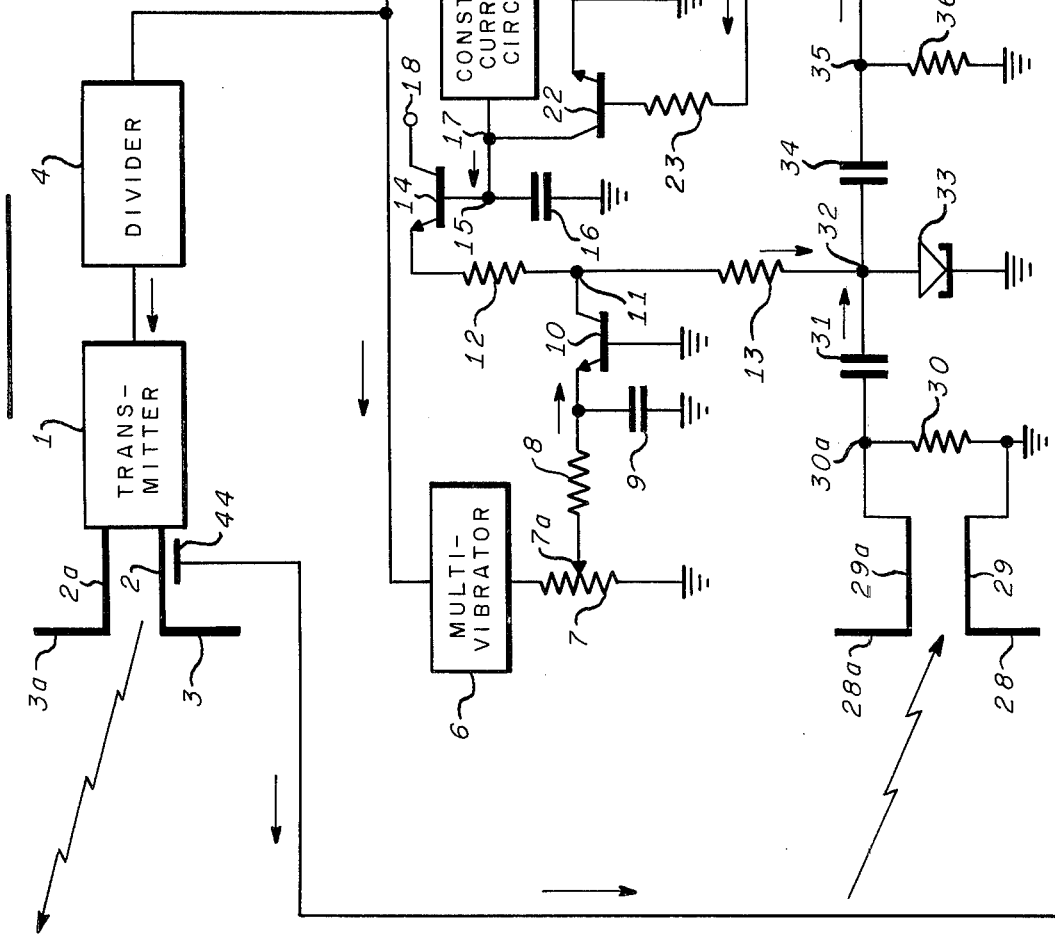
FIG. 1 is a diagram of a preferred embodiment of the invention showing components thereof and their electrical interconnections.

Referring now to FIG. 1, the novel pre-collision sensor utilizes a short pulse transmitter 1, which is preferably a generator of a train of base band or subnanosecond-duration electromagnetic impulses and is activated by a synchronizing wave form supplied through frequency divider 4 and lead 5 from a clock or system synchronizing circuit 27, as will be explained. Flow of regularly recurring synchronizing impulses into transmitter 1 may, for example, be used to control the opening and closing of a mechanical switch such as a mercury-wetted, normally-open reed switch. Through each cyclic operation of the switch, a simple dipole radiator antenna 3, 3a is excited and transmission of a base band signal toward a possible reflecting object afforded with a regular time period 4T.

The transmitter 1 and its associated antenna 3,3a are connected by a non-dispersive two-wire transmission line, such as indicated at 2,2a. The transmitter 1 may take any of several forms, such as that of the G.F. Ross, D. Lamensdorf, U.S. Pat. No. 3,659,203 for a "Balanced Radiator System," issued Apr. 25, 1972 and assigned to the Sperry Rand Corporation. Suitable base band transmitter and antenna arrangements are further illustrated in the G.F. Ross U.S. Pat. No. 3,735,398 for a "Base Band Short Range Pre-Collision Sensor for Actuating a Vehicle Safety Apparatus," also assigned to the Sperry Rand Corporation. The pre-collision sensor of the present invention, as noted in the foregoing, is particularly useful with a semiconductor base band transmitter such as that disclosed by C. C. Wang in the U.S. Pat. application Ser. No. 387,573, filed Aug. 10, 1973 for a "Circuit for Generating a High Voltage Subnanosecond Pulse from a Step Recovery Diode," and assigned to the Sperry Rand Corporation, issued Aug. 27, 1974 as U.S. Pat. 3,832,568.

Figure 2:
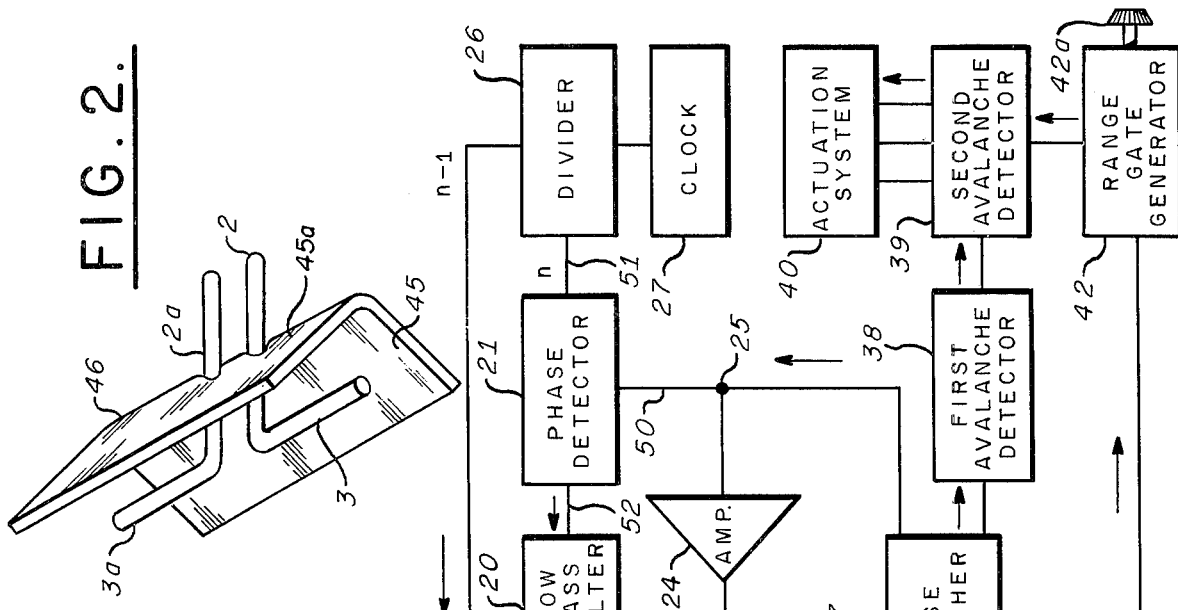
FIG. 2 is a perspective view of an antenna suitable for use as the transmitter or receiver antenna in FIG. 1.

The transmitter antenna 3, 3a may take the particular form shown in FIG. 2 with the leads 2, 2a supporting the antenna dipole elements 3, 3a by projecting through clearance holes in the lineal apex 46 of a conductive reflector made up of similar, flat conducting sheets 45 and 45a. The dipole elements 3, 3a lie in a plane bisecting the vee-shaped cross section of reflector 45, 45a. The dipole antenna 3, 3a has an inherent major degree of directivity in the horizontal or bisecting plane, and the vee-shaped reflector 45, 45a adds desirable directivity in the vertical plane or the plane perpendicular to the bisector plane. Other antenna feeds or reflectors may alternatively be selected.

The receiver dipole antenna 28, 28a is oriented so as to view objects illuminated by energy directed toward such objects by transmitter antenna 3, 3a. The receiver antenna 28, 28a may have a dipole and reflector structure generally similar to that of FIG. 2, but it is coupled for collection of object-reflected base band impulses. In a representative application for measuring the distance between the front of a first vehicle and the rear of a second, the centers of antenna 3, 3a and antenna 28, 28a may be spaced apart by about 50 centimeters with their dipole conductors preferably oriented in the horizontal direction. In a representative configuration, the dipole tips of each dipole pair may be spaced about 10 centimeters apart.

Receiver antenna 28, 28a may be connected to a matching two-wire transmission line 29, 29a directly across a matched resistor 30, one terminal of which is grounded. The second terminal 30a of resistor 30 is coupled through a coupling capacitor 31 to the terminal 32 of a tunnel diode 33. Diode 33 may be generally of the type previously described in the K. W. Robbins U.S. Pat. NO. 3,662,316, issued May 9, 1972 for a "Short Base Band Pulse Receiver" and assigned to the Sperry Rand Corporation. Diodes suitable for application as diode 33, whose terminal opposite terminal 32 is grounded, include conventional silicon tunnel diodes having a negative resistance current-voltage characteristic such that, under proper bias, the diode 33 responds to the collection of an echo signal by antenna 28, 28a by moving abruptly into a region of instability, becoming highly conductive, such as the type TD-252A diode. The input circuit coupling the antenna 28, 28a to diode 32 is matched in the conventional manner to the TEM mode transmission line 29, 29a by well known techniques so that substantially the entire energy of the received base band pulse wave form is absorbed by tunnel diode 33. Such arrangements are also discussed in the aforementioned G. F. Ross, K. W. Robbins U.S. Pat. application Ser. No. 380,628.

Tunnel diode 33 is placed in a gain control loop whereby its sensitivity to received echo pulses is determined and whereby useful output signals for actuating a protective system are supplied to a protective actuation system as represented at 40. For the first purpose, junction 32 of tunnel diode 33 is coupled by capacitor 34 to pulse stretching circuit 37. The input circuit to pulse stretcher 37 includes a resistor 36 coupling input terminal 35 to ground. The output of pulse stretcher 37 is supplied by a first lead to a junction 25 where it is coupled to parallel circuits.

A first of the parallel circuits fed from junction 25 includes a pulse phase detector 21, a second input of which is supplied through frequency divider 26 from the aforementioned system synchronizer clock 27. The output of pulse phase detector 21 is coupled through low pass filter 20 to activate a conventional constant current circuit 19 whose output appears at junction 17.

The second parallel circuit fed from junction 25 includes the wide band pulse amplifier 24. The output of amplifier 24 is fed through the base resistor 23 of transistor 22, which may be of the 2N5130 type. The emitter of transistor 22 is grounded, while its collector is coupled to junction 17 along with the output of constant current circuit 19.

The signals appearing at junction 17 are coupled to junction 15 lying between the base of transistor 14 and a discharge capacitor 16, the second terminal of which capacitor is grounded. Transistor 14 may be of the 2N5130 type and has its collector coupled to an appropriate power supply, not shown, connected to terminal 18. The emitter current of transistor 14 is supplied through the series connected voltage divider resistors 12 and 13 back to the terminal 32 of tunnel diode 33.

As has been indicated, the operation of the receiver system and of transmitter 1 is primarily timed by clock 27. Clock 27 and counter or frequency divider 26 supply synchronized signals via lead 5 to transmitter 1. The same signal appearing on lead 5 is coupled to a conventional multivibrator 6 for further gain control purposes. The shortened pulse output of multivibrator 6 is coupled to ground through potentiometer 7, the tap 7a of the latter being connected through resistor 8 to the emitter of transistor 10. Between resistor 8 and the emitter of transistor 10, there is supplied a capacitor 9 coupled to ground. Transistor 10, whose base is grounded, has its collector connected to the junction 11 between resistor elements 12 and 13 and may be of 2N5130 kind.

For providing a useful control signal for operating the pre-collision or protective actuation system 40, a second output of pulse stretcher 37 is supplied to the first avalanche detector 38, which circuit may be generally similar in structure and operation to arrangements disclosed in the G. F. Ross U.S. Pat. No. 3,750,025 for an "Energy Amplifying Selector Gate for Base Band Signals," assigned to the Sperry Rand Corporation. The avalanche detector 38 may utilize a 2N706 B avalanche transistor, with its output supplied as one input to a second or range gated avalanche detector 39. Such avalanche detector circuits and use of them in the range gating of base band signals are discussed in detail in the prior art, and are adapted to supply range or time gating signals for operation of actuation system 40 in the presence of a gated echo-representing signal at the output of first avalanche detector 38. For properly timed operation of range gate generators 42 according to the adjustment of timing control 42a, pulses synchronized with the transmissions of transmitter 1 are coupled by the conventional capacitive pick off 44 and lead 41 to a second input of the range gate generator 42.

The novel pre-collision sensor is seen to utilize a closed-loop tunnel diode receiver system particularly useful with a clock-synchronized base band pulse transmitter 1, the clock synchronizer 27 effecting both synchronization of the closed automatic gain control loop associated with tunnel diode 33 and of the transmitter 1.

Operation of the novel sensor system may be understood with respect to FIG. 1 by considering the output of constant current circuit 19 and emitter follower transistor 14. For example, assume that the current output of the emitter follower transistor 14 into resistor 12 is instantaneously increasing from zero substantially as a lineal function of time. When the amplitude of this current flowing through resistors 12 and 13 into tunnel diode 33 reaches the predetermined transition current for that diode, the latter switches to its high conductivity state. Upon this event, a stepped voltage transition is coupled into pulse stretcher 37. Pulse stretcher 37 may be a conventional monostable multivibrator which produces a lengthened pulse of several microseconds duration when triggered. As noted previously, the stretched output pulse of circuit 37 has three functions.

The first function of the output of pulse stretcher 37, as it passes through amplifier 24 to the discharge control transistor 22, is to discharge capacitor 16. As previously noted, capacitor 16 is the agent producing the saw tooth charging current, a sweep of which caused tunnel diode 33 to change state in the first place. After a consequent discharge of capacitor 16 through transistor 22 to ground, the current flowing out of emitter follower 14 into tunnel diode 33 begins to rise, the total operation resulting in the placement of the saw tooth sweep wave of FIG. 3 across tunnel diode 33. The cyclic operation repeats automatically at a repetition frequency or period T determined by the capacitance of capacitor 16 and by the level of current supplied at junction 17 by constant current circuit 19. By proper choice of these parameters, the frequency of cycling may be set, for example, at substantially 10 kHz.

Figure 4:
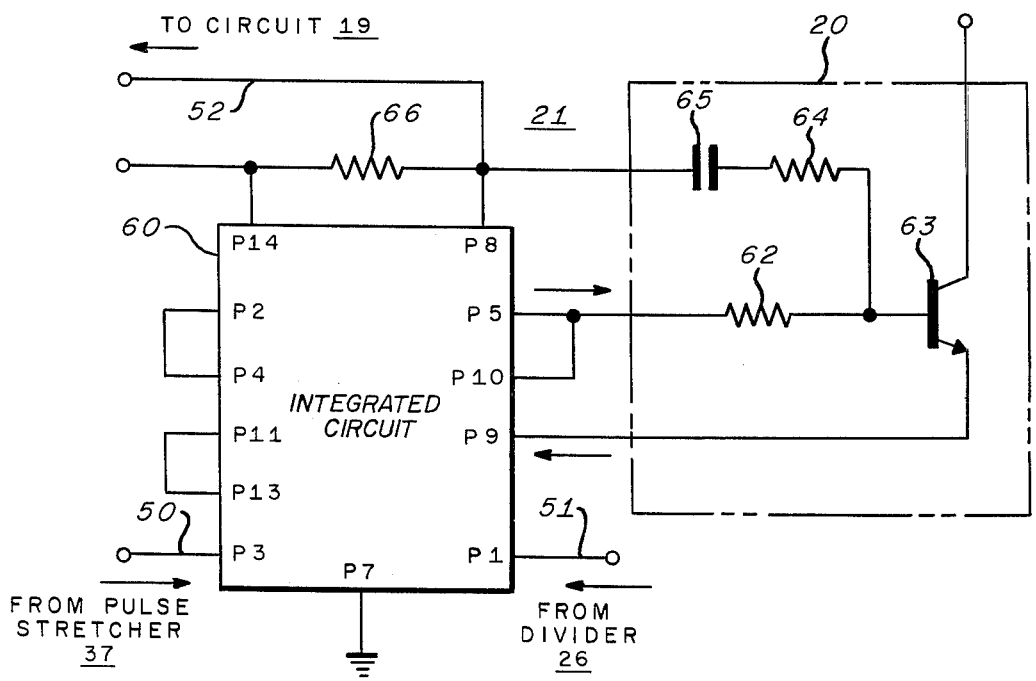
FIG. 4 is a diagram of the phase detector of FIG. 1.

The output of pulse stretcher 37 is supplied through junction 25 to one input terminal of pulse phase detector 21. Phase detector 21, whose structure remains to be discussed in connection with FIG. 4, compares the location of the leading edge of its input from junction 25 to the location of the corresponding pulse formed by divider 26, the trailing edges of the latter pulses being used in the comparator operation. The output frequency from divider 26 supplied to phase detector 21 serves as a reference frequency; for that reason, in the example under discussion, the divider 26 output frequency will also be a substantially 10 kHz signal formed when divider 26 divides down the frequency of the one mHz clock source 27 by a factor of one hundred. Finally, as in prior art base band sensor arrangements, the output of pulse stretcher 37 is also used to initiate the discharge of an avalanche transistor in the first avalanche detector 38, the detector 38 being employed particularly to reconstitute the leading edge of the pulse signal output from pulse stretcher 37.

Figure 3:
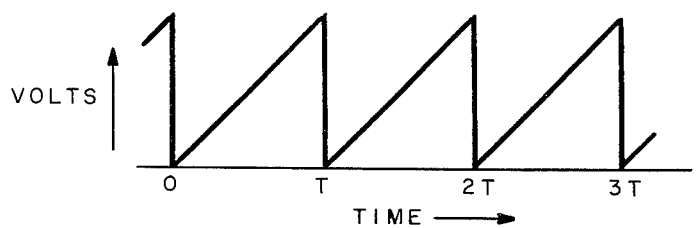
FIG. 3 is a graph of a wave form present in the system of FIG. 1.

The output from phase detector 21 is subjected to the low pass filter 20 before supply to the constant current circuit 19 which, as has been seen, controls the rate of rise of the voltage wave form of FIG. 3 appearing across capacitor 16 and hence, the current wave form flowing through tunnel diode 33. If, for example, the conductivity characteristics of tunnel diode 33 change with temperature in such a way that its characteristic transition current tends to increase, then the period of the saw tooth sweep of FIG. 3 will tend to increase. Such an event will develop an error voltage at the output of phase detector 21, which error voltage will tend to increase the output of the constant current source 19 so as to maintain the period of the saw tooth wave constant.

Because the time constant of the automatic gain control loop may be several microseconds and the loop gain about one hundred, variations due to temperature change and even those caused by large incident echo signals are reduced by a factor substantially equal to the gain of the control loop. While it is desirable that fluctuations in the period T of the wave form of FIG. 3 be not responsive to temperature changes, it is generally not desirable to permit large incident echo signals to control the gain of the loop. Such is especially undesirable in applications of the invention wherein alternative range gate positions are required, as by adjusting control 42a of range gate generator 42. In such applications, a large echo signal appearing in the time of one range gate would dominate control of the loop gain, possibly preventing detection of a relatively smaller signal in the second range gate interval. According to the present invention, this difficulty is obviated by the use of divider 4 to divide the frequency of the transmitter synchronizer trigger appearing on lead 5 by a factor of four. This arrangement gives the gain control loop sufficient time to recover before transmitter 1 is again activated. For example, the gain control loop operating as in the example under discussion has a recovery time about 2.5T at 10 kHz.

Because the period of the gain control loop is held constant by the master or synchronizing clock 27, the divider 26 may take the form of a divide-by-100 counter. In this instance, the nth or 100th transition of divider 26 is used as the reference frequency signal in phase detector 21, while (n-1)th transition is used to synchronize and initiate each output of transmitter 1 just when the receiver system is most sensitive. In the example under discussion, a divider circuit 26 divides the nominal 100 microsecond period into 100 one microsecond intervals. Transmitter 1 radiates a base band pulse approximately 50 nanoseconds after it receives the synchronizing pulse originated in the last stage of divider 26. This same synchronizing pulse appearing on lead 5 is employed to generate a sensitivity time control wave form, as actually generated by multivibrator 6. The sensitivity time control pulse desensitizes the receiver system beginning slightly prior to the start of the transmitted pulse and ending just after the end of the transmitted pulse, thus preventing any directly coupled energy flowing from transmitter antenna 3, 3a to receiver antenna 28, 28a from activating the tunnel diode 33. In particular, this operation is accomplished by triggering the multivibrator 6 whose negative output causes transistor 10 to conduct signals at junction 11 to ground, thus depriving tunnel diode 33 of its normal excitation current. Accordingly, operation of tunnel diode 33 is prevented during radiation of transmitter pulses from antenna 3, 3a.

Any output of the pulse stretcher 37 supplied to the first avalanche detector 38 is thereafter supplied, as previously explained, to the second or range gated avalanche detector 39, where its time of occurrence is compared to the time of generation of an output by range gate generator 42. If the reconstituted output of first avalanche detector 38 coincides in time with the time of the range gate provided by generator 42, then the actuation system 40 is activated for the purpose of restraining vehicle passengers or for other protective purposes. The second avalanche detector may, for example, include multiple range gating channels for providing distinct output signals at first and second distances between the vehicles such as taught in the aforementioned U.S. Pat. No. 3,735,398 and elsewhere, which signals, when present simultaneously in the actuation system 40, cause it to operate protective apparatus. The actuation system 40 may be of the generally conventional type also operable by the actuation of an accelerometer controlled or collision operated switch so as to ensure that the passenger protective apparatus is always ready for failure-safe-operation.

FIG. 4 illustrates in greater detail a particular circuit for use as the pulse phase detector 21 of FIG. 1 with its input on lead 51 from divider 26, its input on lead 50 from junction 25 and pulse stretcher 37, and its output on lead 52 for supply in cooperation with low pass filter 20 to the constant current circuit 19. Circuits for performing the function of the pulse phase detector 21 are well known in the art and are even available on the market as semiconductor microcircuits. Such pulse phase detectors are also described, for example, in the book entitled *Phase Locked Loop Systems Data Book*, Second Edition, August 1973, page 27, et seq., published by Motorola Semiconductor Products. Such microcircuits are available from Motorola Semiconductor Products for use, for example, in phase-frequency detectors under the catalog number MC4344F,L and MC4044F,L,P.

Figures 5, 6:
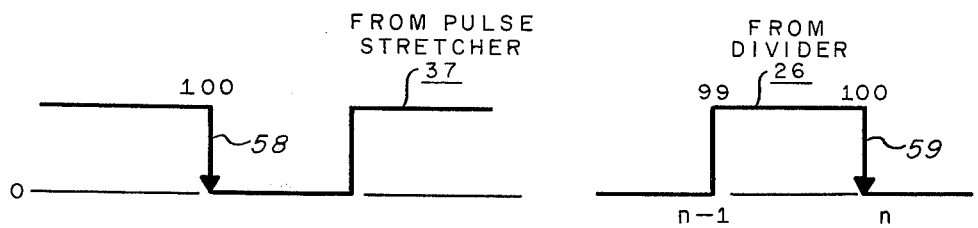
FIGS. 5 and 6 are wave form graphs useful in explaining the operation of the invention.

In the present invention, the circuit 21 deals with the input pulse of FIG. 5 supplied from pulse stretcher 37. This signal falls from the approximately 2 or 3 volt level nearly to ground and it is its falling leading edge 58 that is to be used in the phase measurement. From divider 26, the positive going pulse of FIG. 6 is supplied to the phase detector 21. This signal is a pulse which rises from approximately ground to a 2 or 3 volt level and then falls. It is the falling and trailing edge 59 of the pulse that is to be applied to phase detector 21.

Referring again to FIG. 4, the production phase detector circuit 21 is illustrated by the block 60, the respective signals of FIG. 5 and 6 being applied to pins P3 and P1 of the circuit. As seen in the drawing, pins P2 and P4 and pins P11 and P13 are connected by conductors, as are pins P5 and P10. Pins P5 and P10 are also connected through a resistor 62 to the base of transistor 63. Transistor 63 may be of the 2N5130 type and is supplied with a substantially 5 volt signal coupled to its collector, while its emitter is coupled back to pin P9 of circuit 60. The function of the conventional filter circuit 20 is to provide an active low pass filter, the junction between resistor 62 and transistor 63 being coupled through resistor 64 and capacitor 65 to the output pin P8 of circuit 60. Pin P14 of circuit 60 is supplied with a voltage of the order of 5 volts and is coupled through a resistor 66 to pin P8. Pin P7 of the microcircuit 60 is connected to ground.

The function of the circuit of FIG. 4 is to generate on lead 52 a unidirectional potential, as previously discussed, for application to the constant current circuit 19. The average voltage level of this signal is a representative circuit is about 2.5 volts and, in operation, that signal level may vary between 0.5 and 4 volts. Since the voltage thus supplied is proportional to the phase error between the falling edge 58 of the signal from pulse stretcher 37 and the falling edge 59 of the signal from divider 26, a proportional phase error control voltage is thus supplied whenever operation of the circuit departs from normal and that error is consequently promptly corrected.

Accordingly, it is seen that the invention is a base band radio detection system for the operation of vehicle passenger protective equipment wherein a semiconductor base band transmitter and receiver system is synchronously operated by a master synchronizing clock, providing reliable and precise operation of functional elements of the base band receiver in a low-cost, rugged, and long-lifed configuration.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. In a base band radio object detection system:
   transmitter means for transmitting base band pulse signals toward an object,
   wide band transmission line receiver means for receiving said base band pulse signals after reflection from said object and for propagating received base band pulses substantially without distortion thereof,
   tunnel diode means having first and second terminal means coupled across said wide band transmission line receiver means and having first and second conductivity states, said tunnel diode means being characterized by shifting from said first to said second conductivity state in response to the presence of one of said propagating base band pulse signals at said first terminal means,
   pulse shaping means having an input coupled to said first terminal means,
   pulse phase detector means responsive to said pulse shaping means and to master synchronizer means for providing a control signal,
   constant current circuit means responsive to said control signal for periodically charging capacitor means,
   discharge circuit means responsive to said pulse shaping means for periodically discharging said capacitor means,
   circuit means for coupling said capacitor means to said first terminal means for supplying a saw tooth wave form signal thereto,
   range gate signal generator means responsive to said transmitter means for generating range gate signals,
   detector means responsive to said pulse shaping means and to said range gate signal generator means for producing an actuating output when said one of said propagating base band pulses at said first terminal falls in time within one of said range gate signals, and actuator means responsive to said actuating output.

2. Apparatus as described in claim 1 wherein said master synchronizer means includes:
clock pulse generator means, and
first frequency divider means producing separate output signals for every (n-1)th and every nth clock pulse,
said pulse phase detector means being responsive to each nth output signal.

3. Apparatus as described in claim 2 wherein:
said transmitter means is responsive to second pulse frequency divider means, and
said second pulse frequency divider means is responsive to each (n-1)th output signal.

4. Apparatus as described in claim 1 employed in a passenger operated vehicle, additionally including vehicle passenger protective means responsive to said actuator means.

5. Apparatus as described in claim 1 wherein said discharge circuit means includes transistor switch means responsive to said pulse shaping means for periodically discharging said capacitor means.

6. Apparatus as described in claim 5 wherein said circuit means for coupling said capacitor means to said first terminal means for supplying a saw tooth wave form thereto comprises emitter follower means.

7. Apparatus as described in claim 2 further including gain control means responsive to said (n-1)th pulse responsive output signal for periodically coupling the output of said emitter follower means to said second terminal means for periodic prevention of the operation of said tunnel diode means.

* * * * *